US009778905B1

(12) United States Patent
Walke

(10) Patent No.: US 9,778,905 B1
(45) Date of Patent: Oct. 3, 2017

(54) MULTIPLIER CIRCUITS CONFIGURABLE FOR REAL OR COMPLEX OPERATION

(71) Applicant: Xilinx, Inc., San Jose, CA (US)

(72) Inventor: Richard L. Walke, Edinburgh (GB)

(73) Assignee: XILINX, INC., San Jose, CA (US)

( * ) Notice: Subject to any disclaimer, the term of this patent is extended or adjusted under 35 U.S.C. 154(b) by 80 days.

(21) Appl. No.: 14/995,100

(22) Filed: Jan. 13, 2016

(51) Int. Cl.
*G06F 7/48* (2006.01)

(52) U.S. Cl.
CPC .................. *G06F 7/4812* (2013.01)

(58) Field of Classification Search
CPC .................................. G06F 7/4812
See application file for complete search history.

(56) References Cited

U.S. PATENT DOCUMENTS

| | | | | |
|---|---|---|---|---|
| 6,122,654 | A * | 9/2000 | Zhou ................. | G06G 7/22 708/319 |
| 6,411,979 | B1 * | 6/2002 | Greenberger ......... | G06F 7/4812 708/622 |
| 7,287,051 | B1 * | 10/2007 | Langhammer ........ | G06F 7/5324 708/490 |
| 8,572,153 | B1 | 10/2013 | New | |
| 9,063,870 | B1 * | 6/2015 | Langhammer ........ | G06F 7/5324 |
| 9,081,634 | B1 * | 7/2015 | Simkins .................. | G06F 7/57 |

OTHER PUBLICATIONS

C. R. Baugh, et al., "A Two's Complement Parallel Array Multiplication Algorithm", IEEE Transactions on Computers, Dec. 1973, pp. 1045-1047, vol. C-22, No. 12, IEEE, Piscataway, New Jersey, USA.
Axel Wenzler, et al., "New Structures for Complex Multipliers and their Noise Analysis", Circuits and Systems, 1995. ISCAS '95., 1995 IEEE International Symposium on, Apr. 30-May 3, 1995, pp. 1432-1435, vol. 2, Seattle, WA, USA.

* cited by examiner

*Primary Examiner* — Chuong D Ngo
(74) *Attorney, Agent, or Firm* — David O'Brien; Hong Shi

(57) ABSTRACT

A system includes an integrated circuit coupled to the memory. The integrated circuit is configured to receive first and second complex numbers at one or more data inputs. A first value is determined using a first set of product arrays of a first real number multiplier. A second value is determined using a second set of product arrays of the first real number multiplier and a third set of product arrays of a second real number multiplier. A third value is determined using a fourth set of product arrays of the second real number multiplier. A real value of a first product of the first complex number times a second complex number is determined using the first value and the second value. An imaginary value of the first product is determined using the second value and the third value.

20 Claims, 11 Drawing Sheets

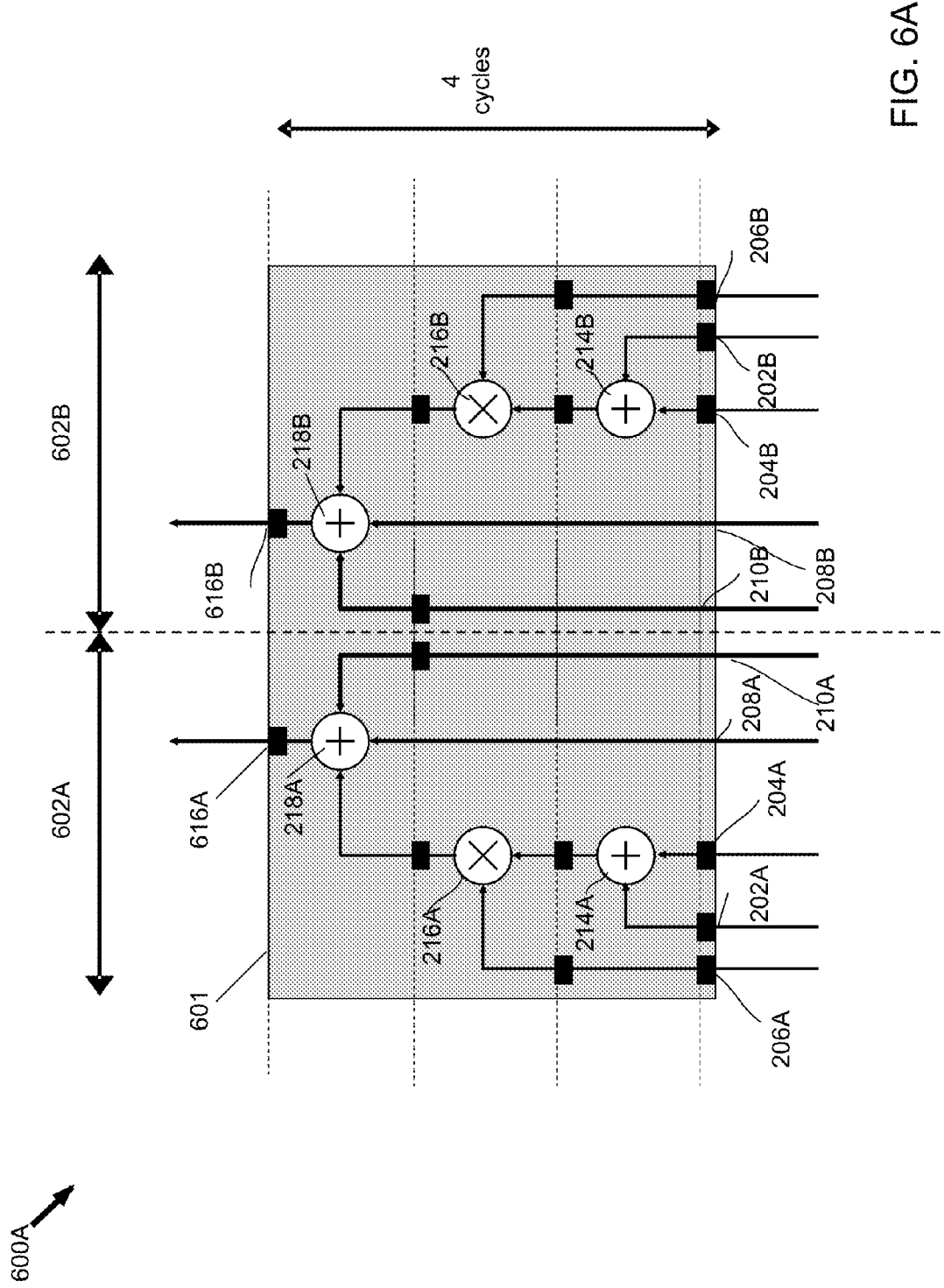

MULTIPLIER CIRCUITS CONFIGURABLE FOR REAL OR COMPLEX OPERATION

FIELD

Examples of the present disclosure generally relate to integrated circuits ("ICs") and, in particular, to an embodiment related to ICs including multiplier circuits.

BACKGROUND

Programmable logical devices (PLDs), for example, field-programmable gate arrays (FPGAs), are a well-known type of programmable IC that can be programmed to implement user-defined logic circuits. There is a demand for PLDs to perform ever more complex tasks, such as the multiplication of complex numbers. To efficiently multiply complex numbers, dedicated resources for handling complex numbers could be provided on a PLD. However, conventional ways to multiply complex numbers may not make efficient use of FPGA resources, and may consume more valuable interconnect resources and FPGA real estate than is desirable.

Accordingly, it would be desirable and useful to provide an improved way of multiplying complex numbers.

SUMMARY

Complex math operations like multiplication are resource-intensive. In current wireless systems, a plurality of digital signal processing (DSP) slices including real number multipliers may be used to implement complex-by-complex multiply and multiply-add operations. Furthermore, dedicated resources for handling complex numbers may be provided to implement the complex operations. However, conventional complex-by-complex multipliers typically used in digital signal processing may not make efficient use of resources, and may consume more valuable resources (e.g., interconnect resources, FPGA real estate) than is desirable. For integrated circuit (IC) solutions, it has been discovered that by splitting the original real number multipliers of the DSP slices into smaller real number multipliers, a complex-by-complex multiplier may be implemented using a smaller number of multiplier DSP slices. Such implementation may achieve reduction in resource consumption, enable more flexible layout, and improve IC performance in power consumption, delay, manufacturing cost, and/or form factor. In some embodiments, a complex-by-complex multiplier may be implemented by integrating two DSP slices, which may significantly reduce both the interface and interconnect requirements. Furthermore, in some embodiments of the present disclosure, it is possible to provide a multiplier circuit configurable to operate in one of two modes. In the first mode, each of the two original real number multipliers of the multiplier circuit may perform a real number multiplication, and output the product. In the second mode, the two original real number multipliers of the multiplier circuit may be configured to provide a single complex multiplier using three or more smaller real number multipliers, which may perform a complex number multiplication and output two values, the real portion of the product and the imaginary portion of the product.

In some embodiments in accordance with the present disclosure, a system includes a memory and an integrated circuit coupled to the memory. The integrated circuit is configured to receive a first complex number and a second complex number at one or more data inputs, determine a first value using a first set of product arrays of a first real number multiplier, determine a second value using a second set of product arrays of the first real number multiplier and a third set of product arrays of a second real number multiplier, determine a third value using a fourth set of product arrays of the second real number multiplier, determine a real value of a first product of the first complex number times a second complex number using the first value and the second value, and determine an imaginary value of the first product using the second value and the third value.

In some embodiments, the integrated circuit is further configured to determine a first portion of the second value using the second set of product arrays of the first real number multiplier; determine a second portion of the second value using the third set of product arrays of the second real number multiplier; and form the second value by using the first portion of the second value and the second portion of the second value.

In some embodiments, A and B represent a real value and an imaginary value of the first complex number respectively, and C and D represent a real value and an imaginary value of the second complex number respectively. The first value is equal to (A−B)*C. The second value is equal to (A+B)*D. The third value is equal to B*(C−D). The real value of the first product is determined by adding the first value and the second value. The imaginary value of the first product is determined by adding the second value and the third value.

In some embodiments, the first portion of the second value may be expressible as:

$$M1a = 2^{-N1} B \sum_{i=N1}^{N2} R_{i-N1} 2^i;$$

the second portion of the second value may be expressible as:

$$M1b = 2^{-(N2-N1)} B \sum_{i=N1}^{N2} R_{i-(N2-N1)} 2^i;$$

wherein R=C−D, M1a represents the first portion of the second value, M1b represents the second portion of the second value, and N1 and N2 are integers.

In some embodiments, at least one of the real value and the imaginary value of the first product is determined using the first value, the second value, and the third value.

In some embodiments, at least one of the real value and the imaginary value of the first product has a latency of five clock cycles from the one or more data inputs.

In some embodiments, the integrated circuit is further configured to switch between a first mode of real number multiplication and a second mode of complex number multiplication.

In some embodiments, the integrated circuit is configured to perform a first real number multiplication using the first real number multiplier and perform a second real number multiplication using the second real number multiplier during operating in the first mode.

In some embodiments, the integrated circuit includes a programmable logic device (PLD).

In some embodiments, the PLD includes a field programmable gate array (FPGA). The FPGA is configured by a configuration bitstream from the memory. The FPGA switches between the first mode of real number multiplication and the second mode of complex number multiplication according to the configuration bitstream.

In some embodiments in accordance with the present disclosure, a method includes receiving, by an integrated circuit, a first complex number and a second complex number at one or more data inputs; computing a first value using a first set of product arrays of a first real number multiplier; computing a second value using a second set of product arrays of the first real number multiplier and a third set of product arrays of a second real number multiplier; computing a third value using a fourth set of product arrays of the second real number multiplier; determining a real value of a first product of the first complex number times a second complex number using the first value and the second value; and determining an imaginary value of the first product using the second value and the third value.

In some embodiments, the computing the second value further includes determining a first portion of the second value using the second set of product arrays of the first real number multiplier; determining a second portion of the second value using the third set of product arrays of the second real number multiplier; and forming the second value by using the first portion of the second value and the second portion of the second value.

In some embodiments, the method further includes during operating in the first mode, performing a first real number multiplication using the first real number multiplier and performing a second real number multiplication using the second real number multiplier.

In some embodiments, the integrated circuit includes a programmable logic device (PLD). The PLD may include a field programmable gate array (FPGA), and the method further includes configuring the FPGA by a configuration bitstream from the memory, and determining a selected mode of the FPGA according to the configuration bitstream.

Other aspects and features will be evident from reading the following detailed description and accompanying drawings.

BRIEF DESCRIPTION OF THE DRAWINGS

FIG. 6A is a block diagram illustrating an integrated circuit for providing two real number multipliers according to some embodiments of the present disclosure.

DETAILED DESCRIPTION

Figure 1:
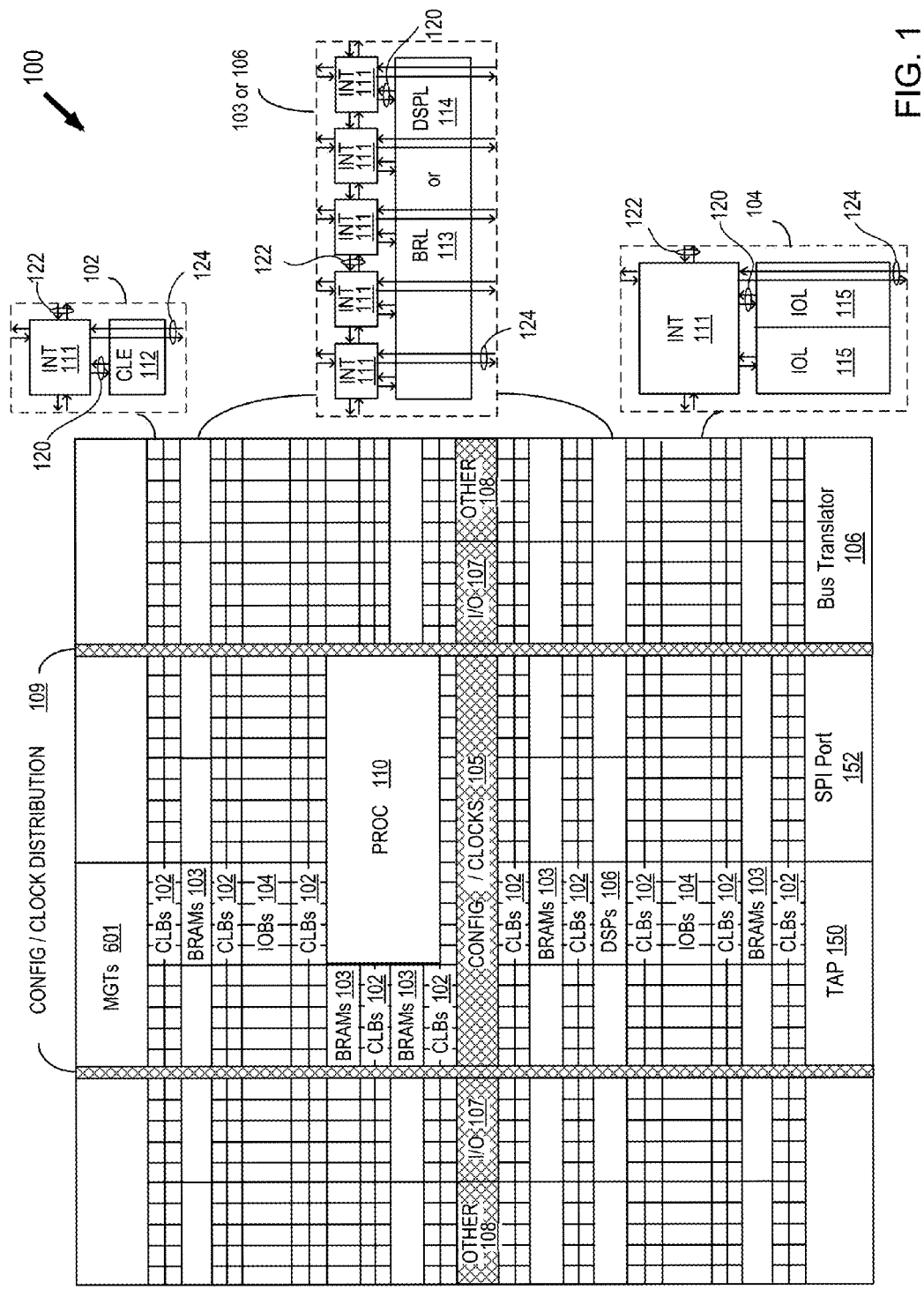
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. A high portion of the operations required by wireless designs are complex-by-complex multiply-add operations. As demands for speed increase, complex-by-complex multiply-add operations in the form of configurable (or programmable) hard macros in SoC, FPGA, or other ICs likewise increases. In some solutions, three or four DSP slices may be used to implement complex-by-complex multiply and multiply-add operations. While the three-DSP-slice solution may reduce the number of DSP slices, it consumes more fabric resources. Furthermore, having three DSP slices residing in separate DSP columns may present packing and optimization challenges. Thus, it is desirable to implement complex-by-complex multiply-add operations using fewer DSP slices to reduce cost and implementation complexity.

With the above general understanding borne in mind, various embodiments for providing real number multipliers and complex number multipliers are described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or anti-fuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

Figure 2A:
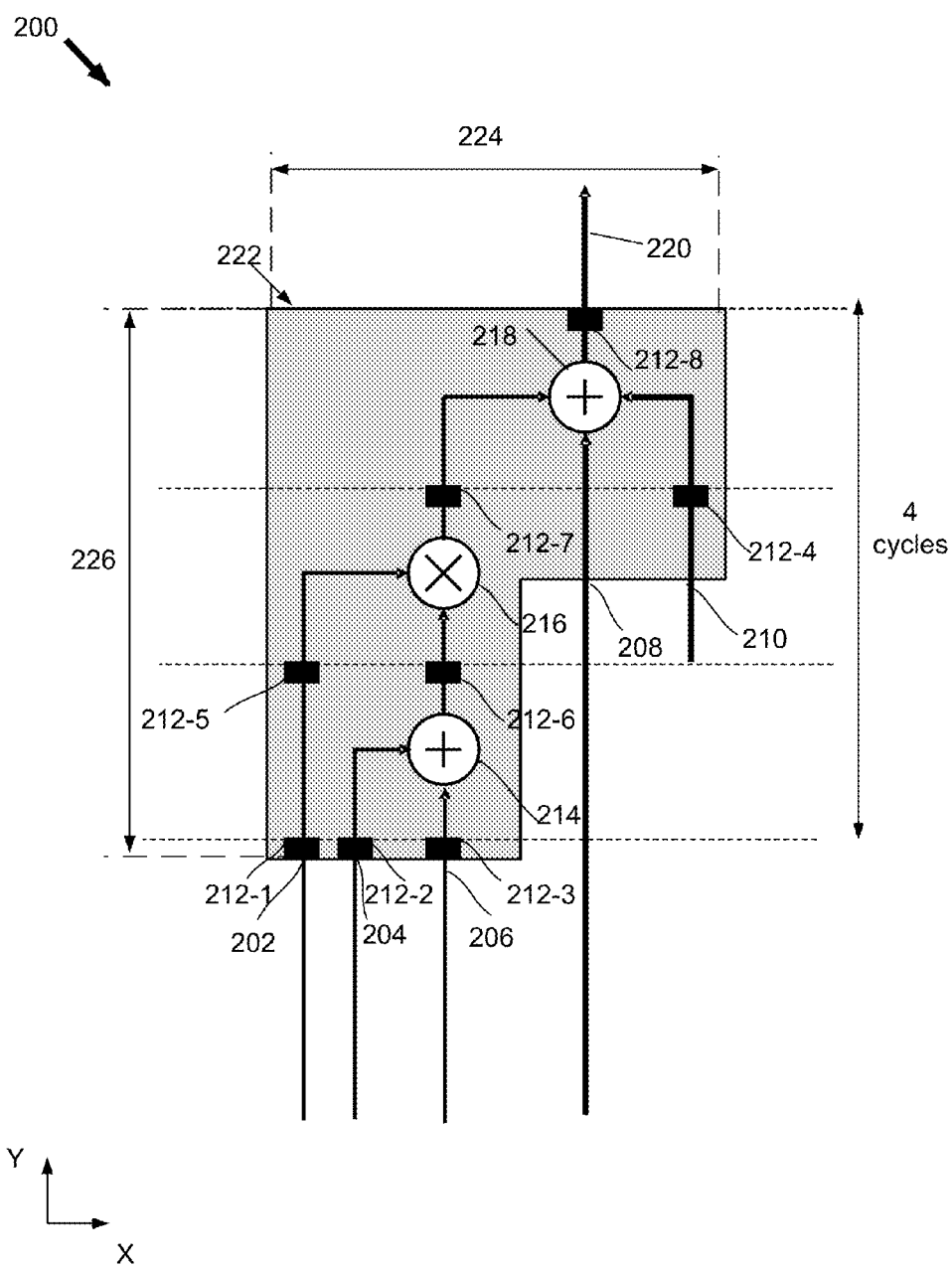
FIG. 2A is a block diagram illustrating an exemplary digital signal processing (DSP) slice according to some embodiments of the present disclosure.

Referring now to FIG. 2A, illustrated is a block/circuit diagram depicting an exemplary DSP slice. In some embodiments, a programmable logic device (PLD) may include DSP slices, where "slices" are logically similar circuits that can be cascaded as desired to create DSP circuits of varying size and complexity. Each DSP slice may include a plurality of operant unit ports and a slice output port, all of which may be programmably connected to general routing and logic resources. The operant unit ports may receive operands for processing, and a slice output port conveys processed results. Each slice may additionally include a feedback port connected to the respective slice output port, to support accumulate functions in this embodiment, and a cascade input port connected to the output port of an upstream slice to facilitate cascading.

In some embodiments, DSP slices may include programmable operand input registers that can be configured to introduce different amounts of delay, from zero to two clock cycles, for example. In one embodiment, the output of at least one operand input register may connect to the input of an operand input register of a downstream DSP slice so that operands may be cascaded among a number of slices.

Referring to the example of FIG. 2A, in some embodiments, the DSP slice 200 may be an exemplary DSP 106 of FPGA 100 of FIG. 1. Alternatively, the DSP slice 200 may not be in an FPGA, but may be used in any of a variety of ICs having configurable hard macro blocks.

As illustrated in FIG. 2A, in some embodiments, with respect to an input interface of DSP slice 200, operant unit ports 202, 204, 206, and 210 (also referred to as inputs 202, 204, 206, and 210) are connected to registers 212-1, 212-2, 212-3, 212-4 respectively, and an input 208 may be connected to an adder 218. In the example of FIG. 2A, the input 202 is provided to a register 212-1, which may be connected to a register 212-5. A multiplication operand may be output from the register 212-5 and sent to a first input of a real number multiplier 216. The input 204 is provided to a register 212-2, and an output from the register 212-2 is provided to an adder/subtractor 214. The adder/subtractor 214 may be capable of both adding and subtracting numbers. The input 206 is provided to a register 212-3, and an output from the register 212-3 is provided to the adder/subtractor 214. The adder/subtractor 214 performs an addition or subtraction to compute a pre-multiplication result of the numbers received from the inputs 204 and 206. The pre-multiplication result is sent to the register 212-6, and is then sent to a second input of the real number multiplier 216. The real number multiplier 216 multiplies the number received from the input 202 and the pre-multiplication result, and provides the product to a register 212-7. The multiplication result is sent from the register 212-7 to a first input of an adder/subtractor 218, which is capable of both adding and subtracting numbers. In some embodiments, the adder/subtractor 218 may have a second input that receives a number from an input 208. In some embodiments, the adder/subtractor 218 may have a third input receiving a number from an input 210 through the register 212-4. The adder/subtractor 218 may perform an addition or subtraction of the received numbers, and send the result to the register 212-8.

In various embodiments, the inputs 202, 204, 206, 208, and 210 may have different bit widths. For example, the inputs 202, 204, 206, 208, and 210 may be 18, 27, 27, 48, and 48 bits wide respectively. In other embodiments, other bit widths for these signals may be used. Furthermore, the terms "input" and "output" are used interchangeably to indicate a signal, a port, and/or a bus.

In some embodiments, the DSP slice 200 may be configured to receive unsigned binary numbers on the inputs 202, 204, 206, 208, and 210. In some embodiments, the DSP slice 200 may be configured to receive signed binary numbers in two's complement representation or another representation of signed numbers on the inputs 202, 204, 206, 208, and 210.

With respect to an output interface of DSP slice 200, a register 212-8 connecting to the second adder 218 provides a slice output port 220. In some embodiments, the slice output port 220 may support output propagation and be referred to as a cascade output 220. In some embodiments, the slice output port 220 may be 48 bits wide. However, in other embodiments, other bit widths may be used. As illustrated in FIG. 2A, in some embodiments, the slice output port 220 may have a latency of four clock cycles comparing to the inputs 202, 204, and/or 206.

As illustrated in FIG. 2A, in some embodiments, the DSP slice 200 occupies a die area 222, which extends a distance 224 in the X direction, and a distance 226 in the Y direction.

Figure 2B:
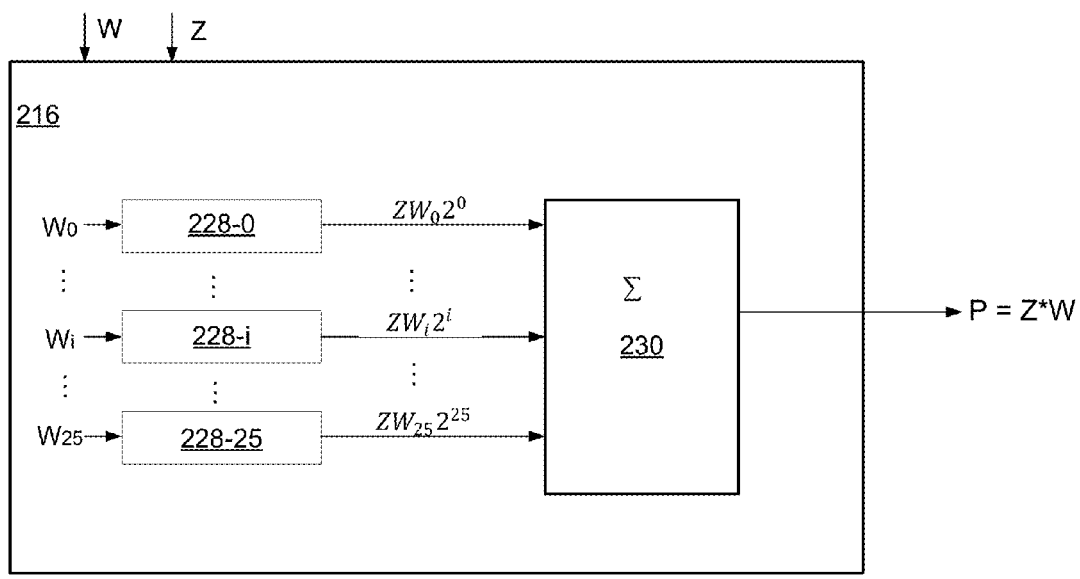
FIG. 2B is a block diagram illustrating an exemplary real number multiplier of FIG. 2A according to some embodiments of the present disclosure.

Referring now to FIG. 2B, illustrated is an exemplary real number multiplier 216 of the DSP slice 200. In some embodiments, the real number multiplier 216 is an L-bit by N-bit multiplier, where L and N are positive integers. In the example of the FIGS. 2B and 2C, L is 16, and N is 26. In some embodiment, the L and N of the real number multiplier 216 may have other values. In some embodiments, the real number multiplier 216 may perform a digital multiplication of an L-bit binary number Z and an N-bit binary number W. Let Wi be the ith bit of W, L=16, and N=26, the product P of Z times W may be computed using the weighted products between the bits of W and Z as follows:

$$P = Z \sum_{i=0}^{25} W_i 2^i$$

As illustrated in the example of FIG. 2B, for each integer i between 0 and 25, the real number multiplier 216 may include a product array 228-$i$ to compute the corresponding partial product row $ZW_i 2^i$. In some embodiments, the product arrays 228-0 to 228-25 may independently compute the partial product rows $ZW_0 2^0$ to $ZW_{25} 2^{25}$ in parallel. In some embodiments, the product P is formed by accumulating (summing) the partial product rows $ZW_0 2^0$, $ZW_1 2^1$, . . . , $ZW_{25} 2^{25}$, e.g., by using an adder 230.

In some embodiments, the real number multiplier 216 and its product arrays may be configured to support multiplications of either unsigned numbers or signed numbers. For example, for signed number multiplication, the partial products may be sign-extended up to the width of the product before summing. Alternatively, in some examples, sign extension may be avoided in signed number multiplication, for example, by using the Baugh-Wooley multiplication method.

Figure 3:
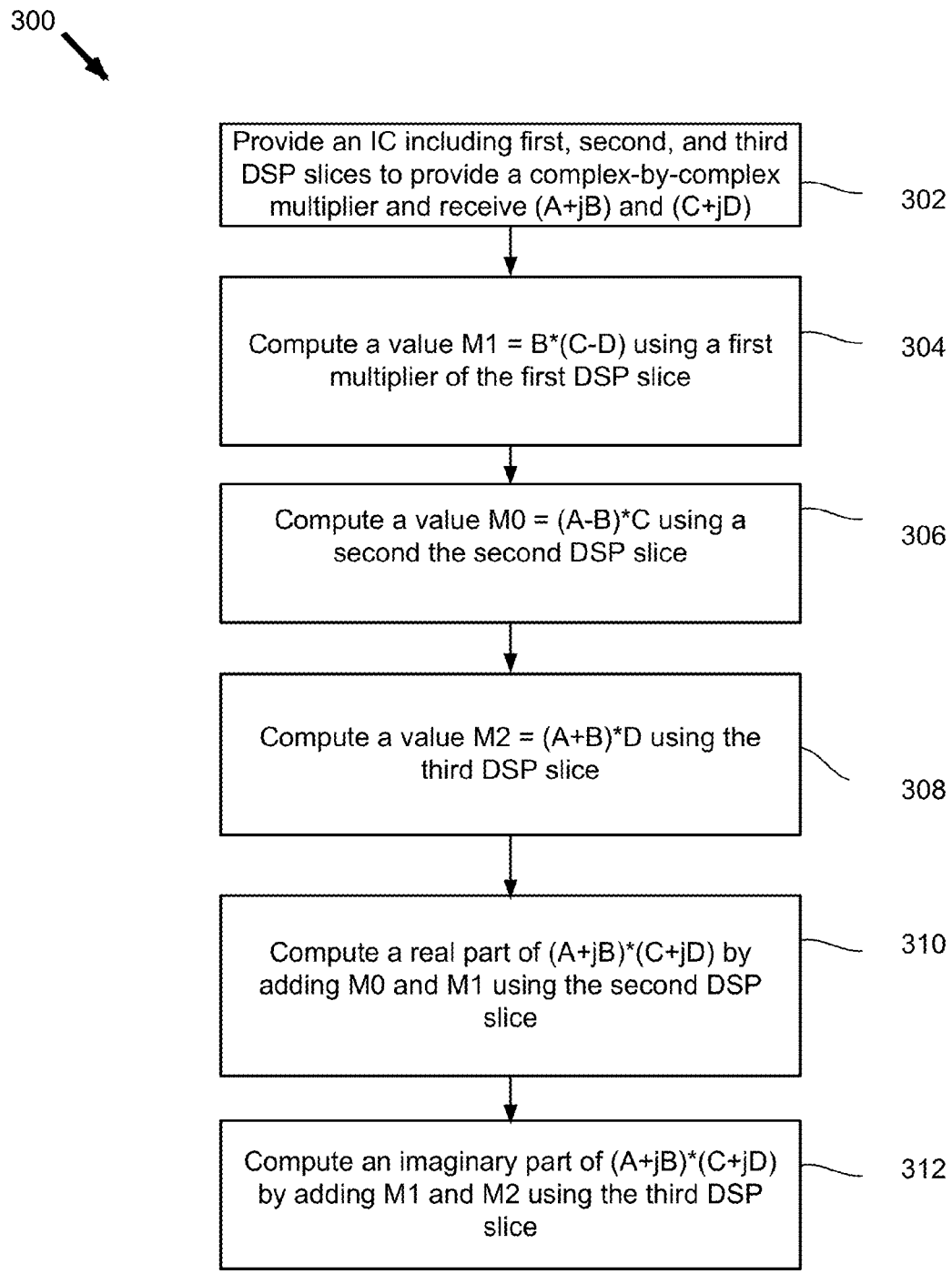
FIG. 3 is a flow diagram illustrating a method for providing a complex-by-complex multiplier according to some embodiments of the present disclosure.

Referring now to FIG. 3, illustrated in FIG. 3 is a flow diagram of one embodiment of a method 300 for providing a complex-by-complex multiplier. The method 300 begins at block 302, where an IC including first, second, and third DSP slices is configured to provide a complex-by-complex multiplier.

Generally, a multiplication of two complex numbers involves four real number multiplication operations and two real addition/subtraction operations. Specifically, the multiplication of the two complex numbers A+jB and C+jD, where j=sqrt (−1), may be broken down as follows:

$(A+jB)*(C+jD)=(AC-BD)+j(AD+BC)=G1+jH1$, where G1=AC−BD is the real value of the product, and H1=AD+BC is the imaginary value of the product. This breakdown involves four multiplications including AC, BD, AD, and BC, and two real addition/subtraction operations including (AC−BD) and (AD+BC).

In some embodiments, the multiplication of two complex numbers may be performed using three real multiplication operations. For example, G1 and H1 of the product may be expressed as follows:

$G1=AC-BD=(A-B)*C+B*(C-D)$;

$H1=AD+BC=(A+B)*D+B*(C-D)$.

Let Q=A−B, R=C−D, S=A+B, three multiplication operations may be performed as follows:

$M0=Q*C$;

$M1=B*R$; and $M2=S*D$.

The real value G1 and the imaginary value H1 of the product may be then expressed as follows:

$G1=M0+M1$; and $H1=M2+M1$,

This breakdown involves three multiplications including Q*C, B*R and S*D, and five real addition/subtraction operations including (A−B), (C−D), (A+B), (M0+M1), and (M2+M1). The terms Q=A−B, R=C−D, and S=A+B may be referred to as "pre-multiplication operations" and may be calculated to feed real number multipliers included in the DSP slices. The terms (M0+M1) and (M2+M1) may be referred to as "post-multiplication operations," and may be calculated using the output from the real number multipliers in the DSP slices.

While an exemplary structure of performing a complex multiplication using three real multiplication operations is provided above, other structures of performing a complex multiplication using three real multiplication operations may be used while remaining within the scope of the present disclosure. For example, while each of G1 and H1 may be computed using only two of the three real multiplication results M0, M1, and M2, in some embodiments, at least one of G1 and H1 may be computed using all three values generated by the three multiplication operations. In one example, G1 and H1 may be expressed as follows, where H1 is determined using all three real multiplication results M3, M4, and M5:

$G1=M3-M4$ $H1=M5-M3-M4$, where M3=A*C, M4=B*D, and M5=(A+B)*(C+D).

In some embodiments, a third complex number E+jF may be added to the product of the first complex number A+jB and the second complex number C+jD. The result may be expressed as follows:

$(A+jB)*(C+jD)+(E+jF)=(G1+E)+j(H1+F)=G2+jH2$;

where G2=G1+E is the real value of the multiply-add result, and H2=H1+F is the imaginary value of the multiply-add result.

Figure 4:
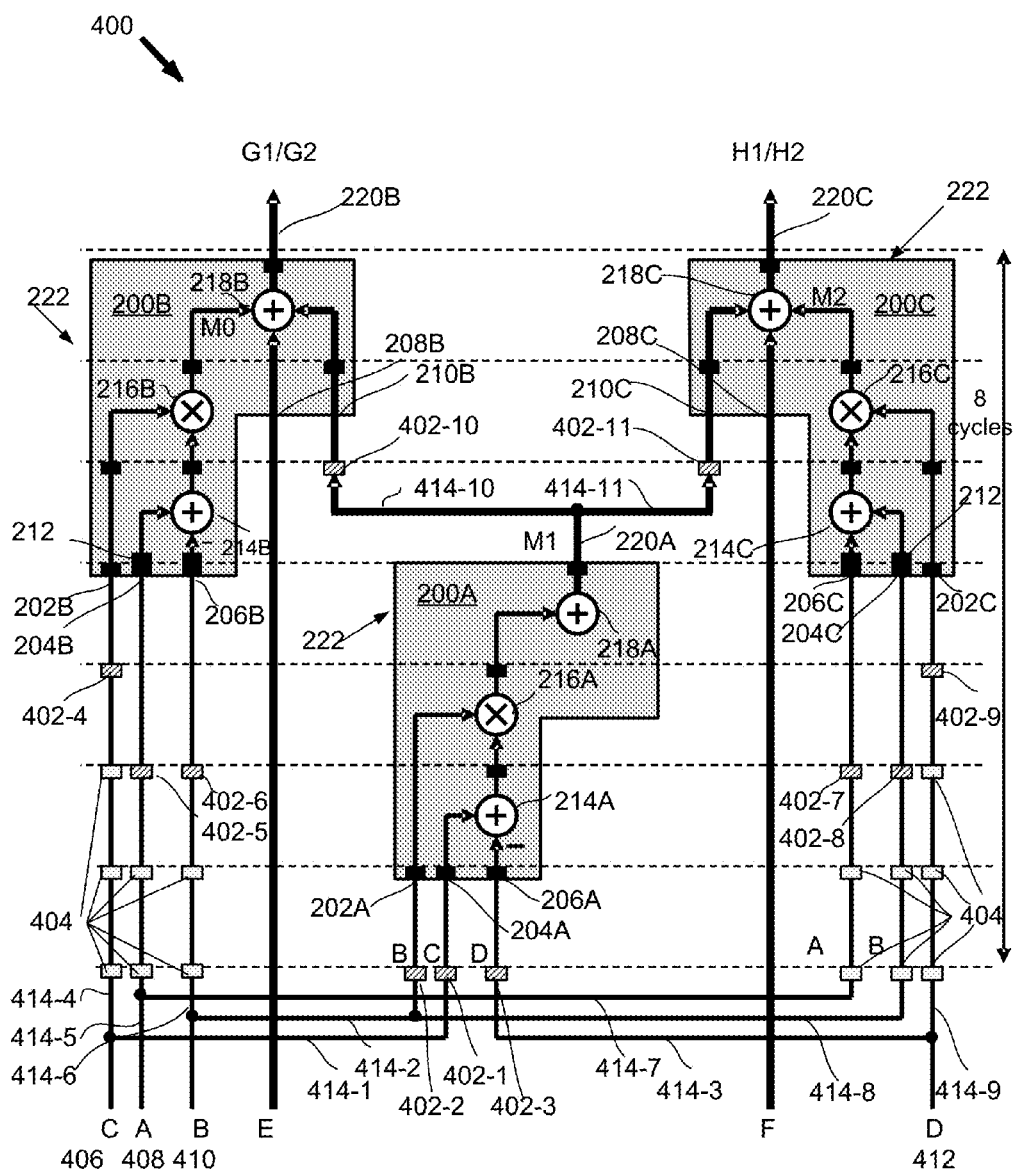
FIG. 4 is a block diagram illustrating an integrated circuit for providing a complex-by-complex multiplier according to some embodiments of the present disclosure.

Referring now to the example of FIG. 4, at block 302, an IC 400 is provided to multiply two complex numbers and add a third complex number. In some embodiments, the IC 400 includes a first DSP slice 200A, a second DSP slice 200B, and a third DSP slice 200C. Each of the DSP slices 200A, 200B, and 200C may be substantially similar to the DSP slice 200 of FIG. 2. In some embodiments, the DSP slices 200A, 200B, and 200C may be placed in different columns and/or different rows. In the example of FIG. 4, in the X direction, the DSP slices 200A, 200B, and 200C are placed in different columns, and in the Y direction, the DSP slices 200B and 200C may be placed in the same row, the DSP slice 200A is placed in a different row. Because of the distances between the DSP slices 200A, 200B, and 200C in the X and/or Y directions, interconnect elements 414 may be pipelined using pipeline registers 402 and pipeline balancing registers 404 to achieve high speed and flexible layout. This may be important when the IC 400 is highly utilized. In some embodiments, the DSP slices 200A, 200B, and 200C in the IC 400 have a total of 16 I/O ports (e.g., 202A-206A, 202B-210B, 202C-210C, 220A, 220B, and 220C).

As illustrated in FIG. 4, in some embodiments, the IC 400 receives the real value A and the imaginary value B of the first complex number A+jB, the real value C and the imaginary value D of the second complex number C+jD at its inputs 408, 410, 406, 412 respectively. The IC 400 may also receive the real value E and the imaginary value F of the third complex number E+jF at the inputs 208B and 208C (e.g., via a cascade port) respectively. In some embodiments, each of the numbers A, B, C, D, E, and F is a binary number. In some embodiments, each of the numbers A, B, C, D, E, and F are 16-bit wide. In other embodiments, the numbers A, B, C, D, E, and F may have other bit widths.

Referring back to FIG. 3, the method 300 then proceeds to block 304, where the value M1 is computed using a first multiplier of the first DSP slice. Referring now to the example of FIG. 4, the value M1 is computed using a real number multiplier 216A of the DSP slice 200A. As illustrated in FIG. 4, in some embodiments, the number C is sent from the input 406 to a pipeline register 402-1 using an interconnect element 414-1, then sent from the pipeline register 402-1 to the input 204A of the DSP slice 200A. The number B is sent from the input 410 to the pipeline register 402-2 using an interconnect element 414-2, then sent from the pipeline register 402-2 to the input 202A of the DSP slice 200A. The number D is sent from the input 412 to the pipeline register 402-3 using an interconnect element 414-3, then sent from the pipeline register 402-3 to the input 206A of the DSP slice 200A. In the example of FIG. 4, a total of three pipeline registers including pipeline registers 402-1, 402-2, and 402-3 are used to send numbers C, B, and D to the DSP slice 200B respectively.

In some embodiments, the adder/subtractor 214A may receive numbers C and D from the inputs 204A and 206A respectively, and compute a value R by subtracting D from C. The adder/subtractor 214A may then send the value R to the real number multiplier 216A. The real number multiplier 216A may receive the number B from the input 202A and the value R, perform a multiplication operation to provide a product M1 of B times R. The real number multiplier 216A may then send the result M1 to the output 220A (e.g., through an adder 218A).

Referring back to FIG. 3, the method 300 then proceeds to block 306, where the value M0 is computed using a second multiplier of the second DSP slice. Referring now to the example of FIG. 4, the value M0 is computed using a real number multiplier 216B of the DSP slice 200B. As illustrated in FIG. 4, in some embodiments, the input 406 receives the real value C of the complex number C+jD. The number C is then sent to the input 202B of the DSP slice 200B using an interconnect element 414-4 and a pipeline register 402-4. In some embodiments, one or more pipeline balancing registers 404 are used between the input 406 and the pipeline register 402-4 for balancing interconnect pipeline delays. In some embodiments, the input 408 may receive the real value A of the complex number A+jB. The number A is then sent the input 204B of the DSP slice 200B using an interconnect element 414-5 and a pipeline register 402-5. In some embodiments, one or more pipeline balancing registers 404 are used between the input 408 and the pipeline register 402-5. In some embodiments, the input 410 may receive the imaginary value B of the complex number A+jB, and the number B is then sent to the input 206B of the DSP slice 200B using an interconnect element 414-6 and the pipeline register. In some embodiments, one or more pipeline balancing registers 404 are used between the input 410 and the pipeline register 402-6. In some embodiments, the DSP slice 200B and 200C may include two or more registers 212 at their inputs (e.g., inputs 204B, 206B, 204C, and 206C), which may reduce the number of required pipeline balancing registers 404. In some embodiments, the pipeline balancing registers 404 may be implemented by using 16-bit Shift Register Lookup Table (SRL16) blocks (e.g., implemented using CLBs 102 of FIG. 1), which may implement delays of one to sixteen clock cycles. In the example of FIG. 4, a total of three pipeline registers including pipeline registers 402-4, 402-5, and 402-6 may be used to send numbers A, B, and C from inputs 408, 410, and 406 to the inputs 204B, 206B, and 202B of the DSP slice 200B.

In some embodiments, the adder/subtractor 214B may receive numbers A and B from the inputs 204B and 206B respectively, and compute a value Q by subtracting B from A. The adder/subtractor 214B may then send the value Q to the real number multiplier 216B. The real number multiplier 216B receives the number C from the input 202B and the value Q from the adder/subtractor 214B, and computes a product M0 of Q times C. In some embodiments, the real number multiplier 216B sends the result M0 to the adder/subtractor 218B.

Referring back to FIG. 3, the method 300 then proceeds to block 308, where a value M2 is computed using a third multiplier of the third DSP slice. Referring now to the example of FIG. 4, the value M2 is computed using a real number multiplier 216C of the DSP slice 200C. As illustrated in FIG. 4, in some embodiments, the number A is sent from the input 408 is then sent to the input 206C of the DSP slice 200C using an interconnect element 414-7 and a pipeline register 402-7. In some embodiments, one or more pipeline balancing registers 404 are used between the input 408 and the pipeline register 402-7 for balancing interconnect pipeline delays. In some embodiments, the number B is sent from the input 410 to the input 204C of the DSP slice 202C using an interconnect element 414-8 and a pipeline register 402-8. In some embodiments, one or more pipeline balancing registers 404 are used between the input 410 and the pipeline register 402-8. In some embodiments, the number D is sent from the input 412 to the input 202C of the DSP slice 200C using an interconnect element 414-9 and a pipeline register 402-9. In some embodiments, one or more pipeline balancing registers 404 are used between the input 412 and the pipeline register 402-9. In some embodiments, the pipeline balancing registers 404 may be implemented by using SRL16 blocks. In the example of FIG. 4, a total of three pipeline registers including pipeline registers 402-7, 402-8, and 402-9 may be used to send numbers A, B, and D from inputs 408, 410, and 412 to the inputs 206C, 204C, and 202C of the DSP slice 200C.

In some embodiments, the adder/subtractor 214C may receive numbers A and B from the inputs 206C and 204C respectively, and compute a value S by adding A and B. The adder/subtractor 214C may then send the value S to the real number multiplier 216C. The real number multiplier 216C receives the number D from the input 202C and the value S from the adder/subtractor 214C, and may compute a product M2 of S times D. The real number multiplier 216C may then send the result M2 to the adder/subtractor 218C.

Referring to FIG. 3, the method 300 then proceeds to block 310, where a real value of the multiplication of two complex numbers are calculated using M0 and M1 in the second DSP slice. Referring to FIG. 4, the DSP slice 200B computes the real value of the multiplication using the adder/subtractor 218B using M0 and M1. As illustrated in FIG. 4, the number M1 is sent from the output 220A of the DSP slice 200A to a pipeline register 402-10 using an interconnect element 414-10, and then sent to the input 210B of the DSP slice 200B.

In some embodiments, the adder/subtractor 218B may receive M0 from the real number multiplier 216B and M1 from the input 210B, and compute a real value G1 of (A+jB)(C+jD) by adding M0 and M1. In some embodiments, the adder/subtractor 218B may provide the real value G1 to the output 220B. As illustrated in FIG. 4, in some embodiments, the real value G1 provided by the output 220B may have a latency of eight clock cycles comparing to the inputs 406, 408, 410, and 412.

In some embodiments, where an addend complex number E+jF is provided, the adder/subtractor 218B may receive the real value E of the complex number E+jF from the input 208B, and compute a real value G2 of (A+jB)(C+jD)+(E+jF) by adding G1 and E. In some embodiments, the adder/subtractor 218B may provide the real value G2 to the output 220B. As illustrated in FIG. 4, in some embodiments, the real value G2 provided by the output 220B may have a latency of eight clock cycles comparing to the inputs 406, 408, 410, and 412, and a latency of one clock cycle comparing to the input 208B.

Referring to FIG. 3, the method 300 then proceeds to block 312, where a imaginary value of the multiplication of two complex numbers are calculated using M1 and M2 in the third DSP slice. Referring to FIG. 4, in some embodiments, the DSP slice 200C computes the imaginary value of the multiplication using the adder/subtractor 218C using M1 and M2. As illustrated in FIG. 4, the number M1 is sent from the output 220A of the DSP slice 200A to a pipeline register 402-11 using an interconnect element 414-11, and then sent to the input 210C of the DSP slice 200C.

In some embodiments, the adder/subtractor 218C may receive M2 from the real number multiplier 216C and M1 from the input 210C, and compute an imaginary value H1 of (A+jB)(C+jD) by adding M1 to M2. In some embodiments, the adder/subtractor 218C may provide the imaginary value H1 to the output 220C. As illustrated in FIG. 4, in some embodiments, the imaginary value H1 provided by the output 220C may have a latency of eight cycles comparing to the inputs 406, 408, 410, and 412.

In some embodiments, where an addend complex number E+jF is provided, the adder/subtractor 218C may receive the imaginary value F from the input 208C, and compute an imaginary value H2 of (A+jB)(C+jD)+(E+jF) by adding H1 and F. In some embodiments, the adder/subtractor 218C may provide the imaginary value H2 to the output 220C. As illustrated in FIG. 4, in some embodiments, the imaginary value H2 provided by the output 220C may have a latency of eight cycles comparing to the inputs 406, 408, 410, and 412, and a latency of one clock cycle comparing to input 208C.

Referring now to FIG. 4, a large number of fabric resources may be used to pipeline interconnect elements in the IC 400 of FIG. 4 for high speed operation. Tables 1 and 2 below lists some exemplary fabric resources (e.g., pipeline registers and interconnect elements) required in the IC 400 of FIG. 4. The fabric resources may also affect the die area occupied by the IC 400. In some embodiments, the total die area of the IC 400 may be about 6.3 times the die area 222 of a single DSP slice 200. For example, the total die area of the IC 400 may include the die area for three DSP slices 200A, 200B, and 200C (e.g., 3 times the die area 222). For further example, the total die area of the IC 400 may include the die area for the pipeline registers (e.g., about three times the die area 222).

TABLE 1

Pipeline Register Resources for IC 400

| Pipeline Registers | Type | Flip-Flops (FF) | 16-bit Shift Register Lookup Table (SRL16) |
| --- | --- | --- | --- |
| 402-1 | 16 bit pipeline registers | 16 | |
| 402-2 | 16 bit pipeline registers | 16 | |
| 402-3 | 16 bit pipeline registers | 16 | |
| 402-4 | 16 bit pipeline registers | 16 | |
| 402-5 | 16 bit pipeline registers | 16 | |
| 402-6 | 16 bit pipeline registers | 16 | |
| 402-7 | 16 bit pipeline registers | 16 | |
| 402-8 | 16 bit pipeline registers | 16 | |
| 402-9 | 16 bit pipeline registers | 16 | |
| 404 | 16 bit balancing delays | | 96 |
| 402-10 | 33 bit pipeline registers | 33 | |
| 402-11 | 33 bit pipeline registers | 33 | |
| Total | | 210 | 96 |

TABLE 2

Interconnect Element Resources for IC 400

| Port | Number of destinations | Bus Width (bits) | Total interconnections for port |
| --- | --- | --- | --- |
| 202A | 1 | 16 | 16 |
| 204A | 1 | 16 | 16 |
| 206A | 1 | 16 | 16 |
| 202B | 1 | 16 | 16 |
| 204B | 1 | 16 | 16 |
| 206B | 1 | 16 | 16 |
| 210B | 1 | 33 | 33 |
| 202C | 1 | 16 | 16 |
| 204C | 1 | 16 | 16 |
| 206C | 1 | 16 | 16 |
| 210C | 1 | 33 | 33 |
| 406 | 2 | 16 | 32 |
| 408 | 2 | 16 | 32 |
| 410 | 3 | 16 | 48 |
| 412 | 2 | 16 | 32 |
| 220A | 2 | 33 | 66 |
| 220B | 1 | 34 | 34 |
| 220C | 1 | 34 | 34 |
| Total | | | 488 |

Figure 5:
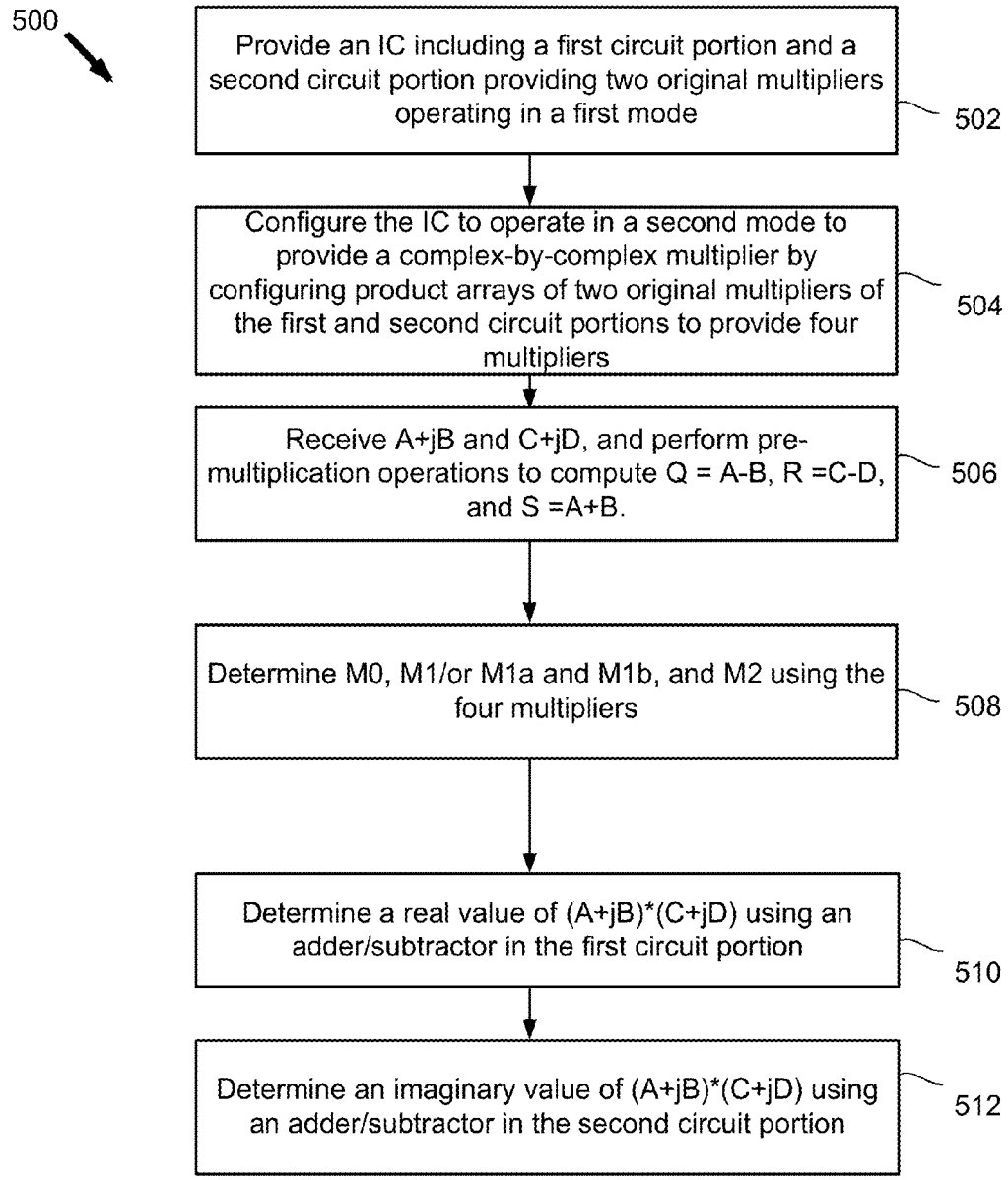
FIG. 5 is a flow diagram illustrating a method for providing a complex-by-complex multiplier according to some embodiments of the present disclosure.

Referring now to FIG. 5, illustrated in FIG. 5 is a flow diagram of one embodiment of a method 500 for performing a complex number multiplication. The method 500 begins at block 502, where an IC including two circuit portions is provided. Referring to the example of FIG. 6A, an IC 600A including two circuit portions 602A and 602B, which include original multipliers 216A and 216B respectively. In some embodiments, each of the first and second circuit portions 602A and 602B of the IC 600A may be logically substantially similar to the DSP slice 200 of FIG. 2. For example, the original real number multipliers 216A and 216B of the circuit portions 602 and 602B may be logically identical to the real number multiplier 216 of the DSP slice 200 of FIG. 2. For further example, each of the original real number multipliers 216A and 216B may be an L-bit by N-bit multiplier. For further example, the adder/subtractor 214A and 214B may be logically identical to the adder/subtractor 214 of the DSP slice 200, and the adder/subtractor 218A and 218B may be logically identical to the adder/subtractor 218 of the DSP slice 200 of FIG. 2. In some embodiments, the first circuit portion 602A and a second circuit portion 602B are placed in two adjacent columns side by side, and may be cascaded independently. In some embodiments, the first and second circuit portions 602A and 602 are integrated in a single DSP slice 601. In some embodiments, the second circuit portion 602B is a mirror image of the first circuit portion 602A. In some embodiments, each of the first and second circuit portions may occupy a die area greater than the die area 222 of the DSP slice 200 (e.g., by more than about 10% to 20%). In one example, the die area of each of the first and second circuit portions 602A and 602B may be about 15% greater than the die area 222.

In some embodiments, the IC 600A may be capable of operating in two modes, and the mode may be set or selected for example, according to register settings or values stored in one or more memory elements within the IC 600A, and/or through the loading of a configuration bitstream into the IC 600A. Referring to FIG. 6A, in some embodiments, the IC 600A may be set to operate in a first mode corresponding to real number multiplications. In the first mode, the IC 600A may perform two real number multiplications of an L-bit multiplicand and an N-bit multiplier (e.g., in parallel) using the original real number multipliers 216A and 216B respectively. In some embodiments, the results provided by the outputs 616A and 616B may have a latency of 4 cycles comparing to the inputs 202A, 204A, 206A, 202B, 204B, and/or 206B.

Figure 6B:
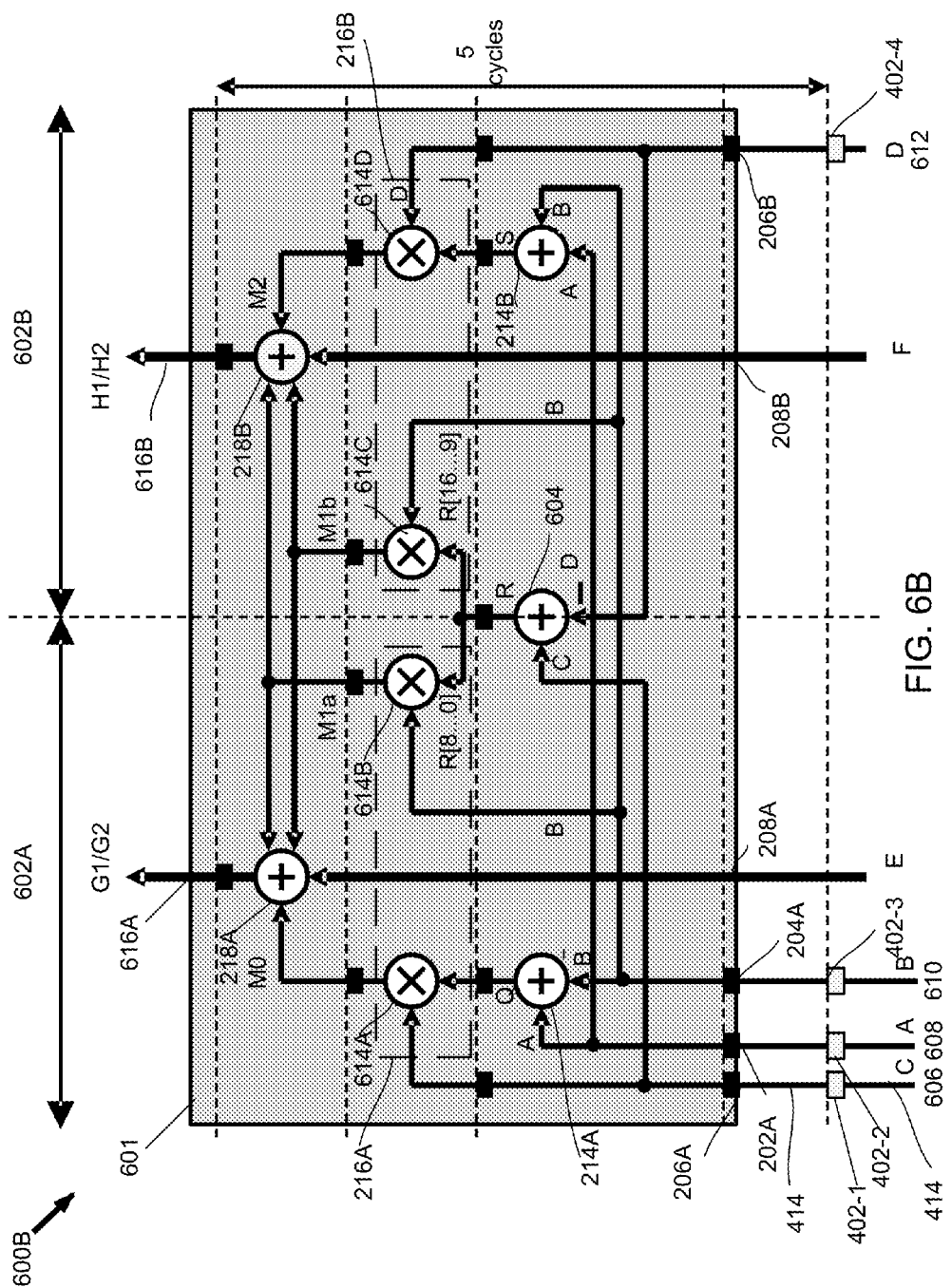
FIG. 6B is a block diagram illustrating an integrated circuit for providing a complex-by-complex multiplier according to some embodiments of the present disclosure.

Referring back to FIG. 5, the method 500 then proceeds to block 504, the IC circuit may be configured to provide a complex-by-complex multiplier (e.g., when set to a second mode corresponding to a complex number multiplication). Referring to FIG. 6B, illustrated is an IC 600B configured to provide a complex-by-complex multiplier. In some embodiments, the IC 600B may be the same as the IC 600A of FIG. 6A configured to operate in the second mode. The IC 600B may provide a single complex-by-complex multiplier using four real number multipliers 614A, 614B, 614C, and 614D, which may be provided by configuring the product arrays of the original real number multipliers 216A and 216B of FIG. 6A. In some embodiments, the DSP slice 601 of the IC 600B may have eight I/O ports (e.g., 202A-208A, 206B, 208B, 616A, and 616B).

Figure 7A:
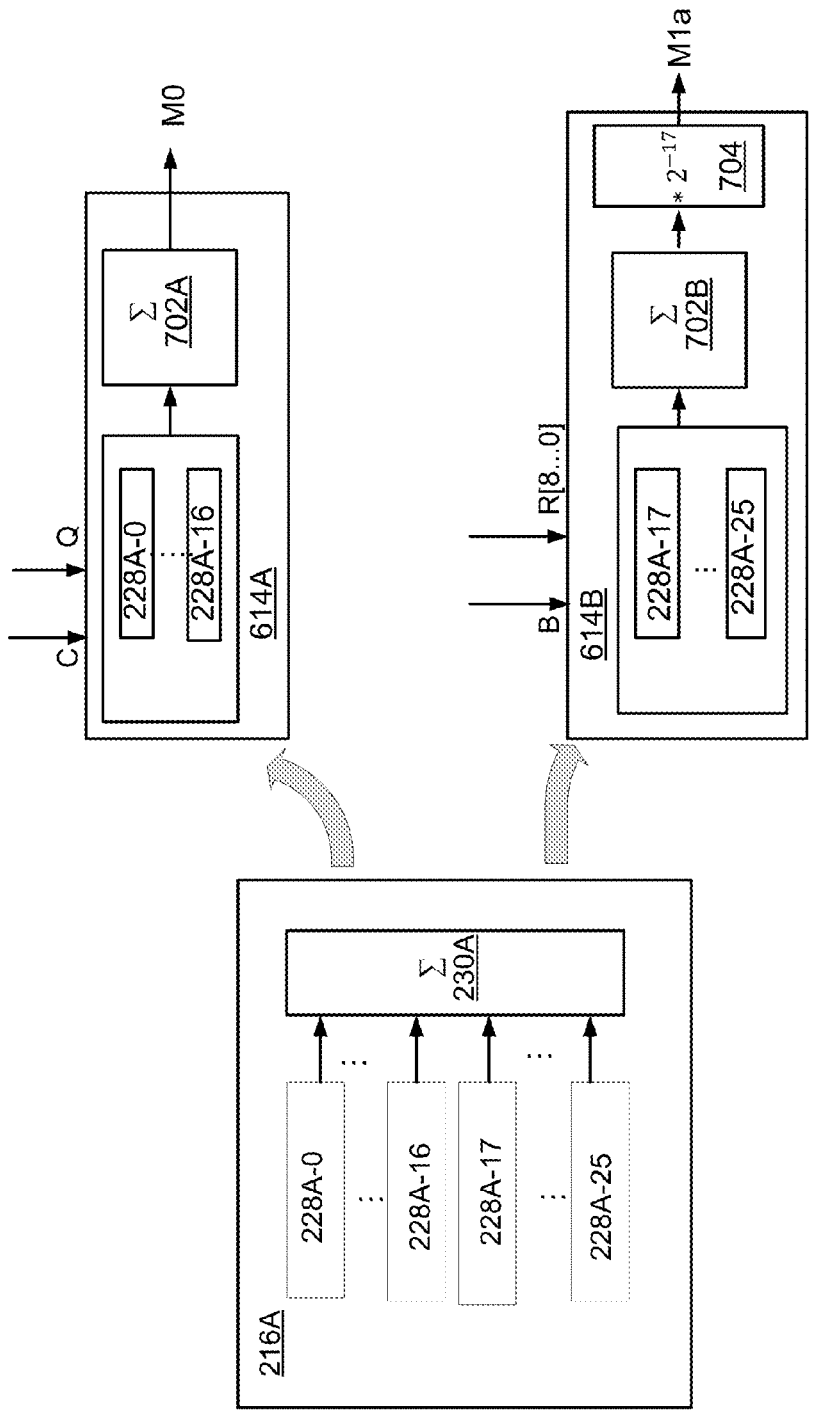
FIGS. 7A, 7B, and 7C are block diagrams illustrating reconfiguration of two real number multipliers to provide a complex-by-complex multiplier.
Figure 7B:
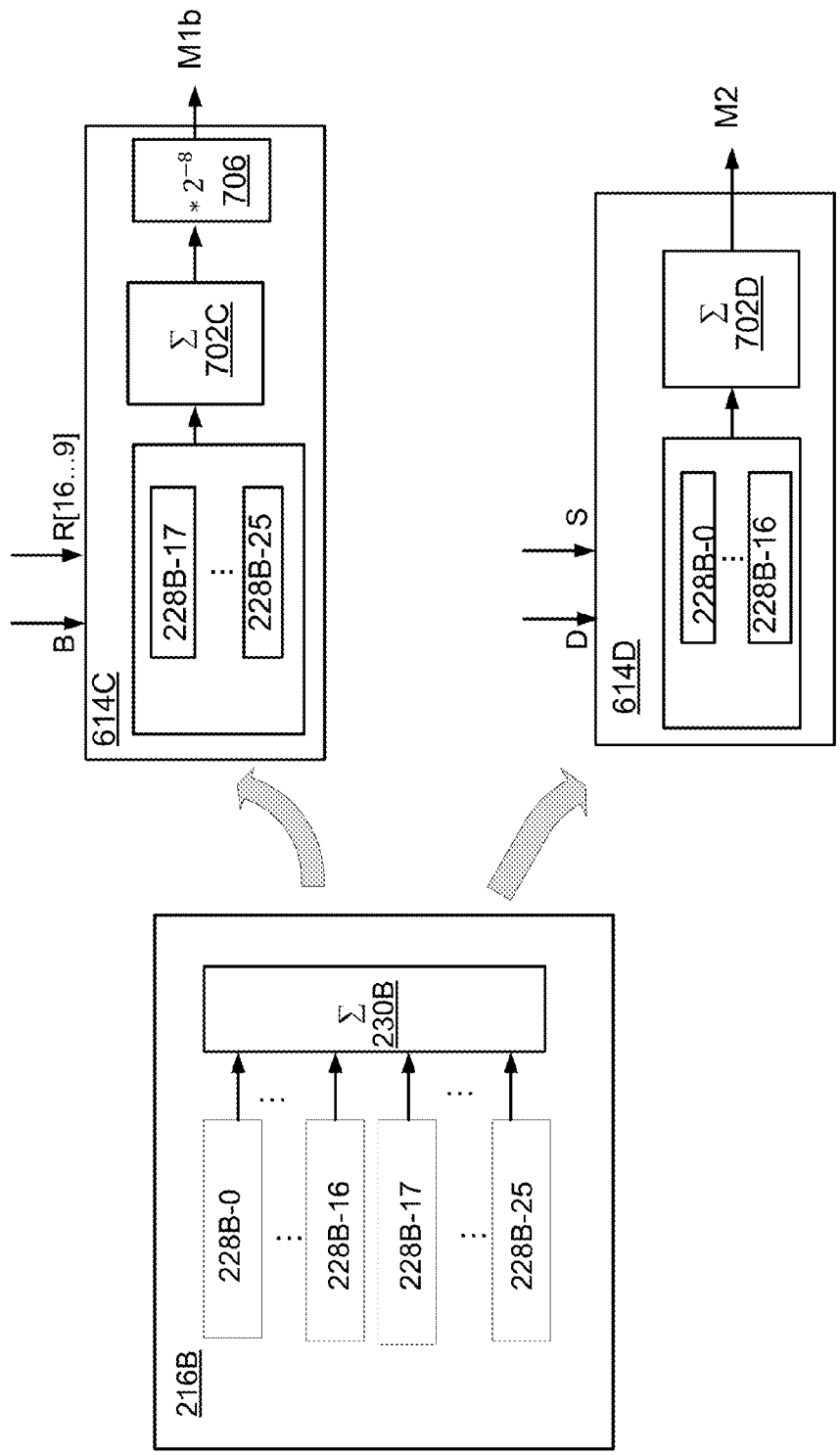

Referring to FIGS. 6B, 7A, and 7B, in some embodiments, the first circuit portion 602A of the IC 600B may include a real number multiplier 614A and a real number multiplier 614B, which are provided by configuring the product arrays of the original real number multiplier 216A of FIG. 6A. The second circuit portion 602B of the IC 600B may include a real number multiplier 614C and a real number multiplier 614D, which are provided by configuring the product arrays of the original real number multiplier 216B of FIG. 6A. In some embodiments, the real number multipliers 614A, 614B, 614C, and 614D may have lower precisions than the original real number multipliers 216A and 216B.

In some embodiments, the IC 600B performs a of complex numbers A+jB and C+jD by computing the values M0, M1, and M2, which may be computed by the real number multipliers 614A, 614B, 614C, and 614D. In the embodiment illustrated in FIGS. 6B, 7A, and 7B, the value M0 may be computed using the real number multiplier 614A, and the value M2 may be computed using the real number multiplier 614D.

In some embodiments, the value M1 may be represented as two parts M1a and M1b, which may be computed by the real number multipliers 614B and 614C respectively. Specifically, the value M1=B*R may be represented as M1a and M1b as follows:

$$M1a = 2^{-17}B\sum_{i=17}^{25} R_{i-17}2^i;$$

$$M1b = 2^{-8}B\sum_{i=17}^{25} R_{i-8}2^i; \text{ and}$$

M1=M1a+M1b.

In some embodiments, M1a is 25 bits, and M1b is 32-bits, but bits i=7 . . . 0 of M1b are 0. As discussed below, in some embodiments, the real number multiplier 614B may be used to compute the value M1a, and the real number multiplier 614C may be used to compute the value M1b.

In some embodiments, the IC 600B may include different configurations to determine G1 and H1 based on various structures used to determine G1 and G2 using three real number multiplications. For example, as discussed above, G1 and H1 may be determined using M3, M4, and M5, where M3=A*C, M4=B*D, and M5=(A+B)*(C+D). The IC 600B may be configured to use the multiplier 614A to compute M3, and use the multiplier 614D to compute M5. The IC 600B may be further configured use the multiplier 614*b* to compute M4a, use the multiplier 614*c* to compute M4b, where M4 may be determined using M4a and M4b (e.g., by adding M4a to M4b). The IC 600B may be further configured to use adders 214A, 204A, 604, and/or additional adders to perform required pre-multiplication operations (e.g., A+B and C+D for computing M5).

Referring now to FIGS. 7A and 7B, the original real number multipliers 216A and 216B are reconfigured to provide the real number multipliers 614A, 614B, 614C, and 614D. As illustrated in FIG. 7A, in some embodiments, the original real number multiplier 216A (e.g., 16-bit by 26-bit) of the first circuit portion 602A may be configured to provide more than one multiplier of lower precisions (e.g., a 16-bit by 17-bit real number multipliers 614A and a 16-bit by 9-bit real number multiplier 614B). In some embodiments, the original real number multiplier 216A may include a plurality of product arrays 228A-0 to 228A-25, and compute the product P of a multiplicand Z and a multiplier W as follows:

$$P = Z\sum_{i=0}^{25} W_i 2^i.$$

For each i, a product array 228A-i may provide a corresponding partial product row $ZW_i 2^i$ of the product the product P of W and Z, where $W_i$ is the ith bit of the multiplier W. In some embodiments, the partial product rows may then be sent to an adder 230A to compute the product P.

In some embodiments, the values M0, M1 a, M1 b, and M2 are formed by using Q, R, and S formed by the pre-multiplication operations. The numbers Q, R, and S may have a word length that is one bit greater than the word length of the numbers A, B, C, and D. For example, the numbers Q, S, and R may have 17 bits, where each of the numbers A, B, C, and D has 16 bits. As such, the multipliers 614A, 614B, 614C, and 614D may be configured to accommodate the word length of the numbers Q, R, and S.

As shown in FIG. 7A, in some embodiments, a first set of the product arrays (e.g., product arrays 228A-0 to 228A-16) of the original real number multiplier 216A may be used to provide a real number multiplier 614A.

In some embodiments, the real number multiplier 614A is an L-bit by (L+1)-bit multiplier, where L is the word length of the number C, and (L+1) is the word length of the number Q. For example, the real number multiplier 614A may receive a 16-bit multiplicand C and a 17-bit multiplier Q, and compute the product M0 as follows:

$$M0 = C*Q = C\sum_{i=0}^{16} Q_i 2^i,$$

where $Q_i$ is the ith bit of the multiplier Q. In some embodiments, in the real number multiplier 614A, for each integer i between 0 and 16, a product array 228A-i may compute a partial product row $CQ_i 2^i$ of the product M0. The partial product rows $CQ_0 2^0$ to $CQ_{16} 2^{16}$ may then be sent to an adder 702A, which combines the partial product rows $CQ_0 2^0$ to $CQ_{16} 2^{16}$ and provides the value M0 to an output of the real number multiplier 614A. In one example, the value M0 is 33-bit wide.

In some embodiments, a second set of the product arrays (e.g., product arrays 228A-17 to 228A-25) of the original real number multiplier 216A may be used to provide a real number multiplier 614B. For example, the real number multiplier 614B may receive a 16-bit multiplicand B and a 9-bit multiplier RL, where RL includes the lower 9 bits of a 17-bit binary number R, and may be expressed as R[8 . . . 0]. In some embodiments, for each integer i between 17 and 25, a product array 228A-i may compute a partial product row $BR_{i-17} 2^i$, where $R_{i-17}$ is the (i-17)th bit of the binary number R. In some embodiments, the partial product rows $BR_0 2^{17}$ to $BR_8 2^{25}$ computed by the product arrays 228A-17 to 228A-25 may be sent to an adder 702B, where an intermediate result J is computed as follows:

$$J = B\sum_{i=17}^{25} R_{i-17} 2^i.$$

In some embodiments, the intermediate result J may be sent from the adder 702B to block 704, where a 17-bit right shift may be applied to the intermediate result J and compute M1a as follows:

$$M1a = B*R_L = 2^{-17}*J = 2^{-17} B\sum_{i=17}^{25} R_{i-17} 2^i.$$

In some embodiments, the fixed shift in block 704 is implemented by one or more wires. In some embodiments, the block 704 may provide the value M1a to an output of the real number multiplier 614B. In one example, the value M1a may be 25-bit wide.

In some embodiments, the adders 702A and 702B of the real number multipliers 614A and 614B may be provided by splitting the adder 230A of the original real number multiplier 216A. Alternatively, additional adders may be used to provide one or both of the adders 702A and 702B.

Referring now to FIG. 7B, in some embodiments, an original real number multiplier 216B (e.g., 16-bit by 26-bit) of the second circuit portion 602B may be configured to provide two or more multipliers of lower precisions (e.g., a 16-bit by 9-bit real number multiplier 614C and a 16-bit by 17-bit real number multiplier 614D). In the example of FIG. 7B, the original real number multiplier 216B may include product arrays 228B-0 to 228B-25, and compute the product P of a multiplicand Z and a multiplier W as follows:

$$P = Z\sum_{i=0}^{25} W_i 2^i.$$

For each integer i between 0 and 25, a product array 228B-i may provide a corresponding partial product row $ZW_i 2^i$ of the product P of W and Z, where $W_i$ is the ith bit of the number W. The partial product rows may then send to an adder 230B to compute the product P.

As illustrated in FIG. 7B, in some embodiments, a first set of the product arrays (e.g., product arrays 228B-17 to 228B-25) of the original real number multiplier 216B are configured to provide a real number multiplier 614C (e.g., 16-bit by 9-bit). In some embodiments, the real number multiplier 614C may receive a 16-bit multiplicand B and a 9-bit multiplier RH. The multiplier RH may include the 9th to the 17th bits of an 18-bit binary number R, and may be expressed as R[17 . . . 9]. In some embodiments, if the binary number R is less than 18 bits, it may be extended to 18 bits prior to provide the multiplier RH to the real number multiplier 614C. For each integer i between 17 and 25, a product array 228B-i may compute a partial product row $BR_{i-8} 2^i$, where $R_{i-8}$ is the (i-8)th bit of the binary number R.

In some embodiments, the partial product rows $BR_9 2^{17}$ to $BR_{17} 2^{25}$ computed by the product arrays 228B-17 to 228B-25 may be sent to an adder 702C, where an intermediate result K is computed as follows:

$$K = B\sum_{i=17}^{25} R_{i-8} 2^i.$$

In some embodiments, the intermediate result K may be sent from the adder 702C to block 706, where an 8-bit right shift may be applied to the intermediate result K and compute M1b as follows:

$$M1b = B*R_H = 2^{-8}*K = 2^{-8} B\sum_{i=17}^{25} R_{i-8} 2^i.$$

In some embodiments, the fixed shift in block 706 may be implemented by one or more wires. The block 706 may then provide the value M1b to an output of the real number multiplier 614C. In one example, M1b may be 32 bits, but bits 0 to 7 of the M1b are 0.

In some embodiments, a second set of the product arrays (e.g., product arrays 228B-0 to 228B-16) of the original real number multiplier 216B may be used to provide a real number multiplier 614D (e.g., 16-bit by 17-bit). In some embodiments, the real number multiplier 614D may receive a 16-bit multiplicand D and a 17-bit multiplier S (e.g., from the adder/subtractor 214B), and compute the value M2 as follows:

$$M2 = D*S = D\sum_{i=0}^{16} S_i 2^i,$$

where $S_i$ is the ith bit of the multiplier S. In some embodiments, in the real number multiplier 614D, for each integer i between 0 and 16, a product array 228B-i may compute a partial product row $DS_i 2^i$ of the product M2. The partial product rows $DS_0 2^0$ to $DS_{16} 2^{16}$ may then be sent to an adder 702D, which combines the partial product rows $DS_0 2^0$ to $DS_{16} 2^{16}$ to provide the value M2 to an output of the real number multiplier 614D.

In some embodiments, the adders 702C and 702D of the real number multipliers 614C and 614D may be provided by splitting the adder 230B of the original real number multiplier 216B. Alternatively, one or both of the adders 702C and 702D are added to the IC 600B, and are not provided by reconfiguring the adder 230B.

Referring back to FIG. 5, the method 500 then proceeds to block 506, where the IC 600B receives A+jB and C+jD, and pre-multiplication operations are performed to compute values Q, R, and S. Referring now to FIG. 6B, in some embodiments, the IC 600B may receive the real value A and the imaginary value B of the first complex number A+jB and the real value C and the imaginary value D of the second complex number C+jD at its inputs 608, 610, 606, and 612. The IC 600B may receive the real value E and the imaginary value F of the third complex number E+jF at its input 208A and 208B respectively (e.g., via a cascade port, or from CLBs or BRAMs). In some embodiments, each of the numbers A, B, C, D, E, and F is a binary number. In some embodiments, each of the numbers A, B, C, D, E, and F are 16-bit wide. In other embodiments, the numbers A, B, C, D, E, and F may have other bit widths.

Referring to the example of FIG. 6B, in some embodiments, ports 606, 608, 610, and 612 receive the numbers C, A, B, and D respectively. The numbers C, A, B, and D may then be sent to the inputs 206A, 202A and 204A of the first circuit portion 602A and the input 206B of the second circuit portion 602B using pipeline registers 402-1, 402-2, 402-3, and 402-4 and interconnect elements 414.

In some embodiments, the adder/subtractor 214A of the first circuit portion 602A receives the numbers A and B from the inputs 202A and 204A respectively, and performs a pre-multiplication operation to compute a value Q by subtracting B from A. In some embodiments, the adder/subtractor 214B of the second circuit portion 602B may receive the numbers A and B from the inputs 202A and 204A respectively, and performs a pre-multiplication operation to compute a value S by adding A and B.

In some embodiments, the IC 600B may also further include an adder/subtractor 604, which may receive the numbers C and D from the inputs 206A and 206B respectively, and performs a pre-multiplication operation to compute a value R by subtracting D from C. In some embodiments, the adder/subtractor 604 may be obtained by re-configuring the adder/subtractors 214A and/or adder/subtractor 214B of the second circuit portion 602B. Alternatively, in some embodiments, the adder/subtractor 604 is added to the IC 600B without using the adder/subtractors 214A and/or adder/subtractor 214B.

Figure 7C:
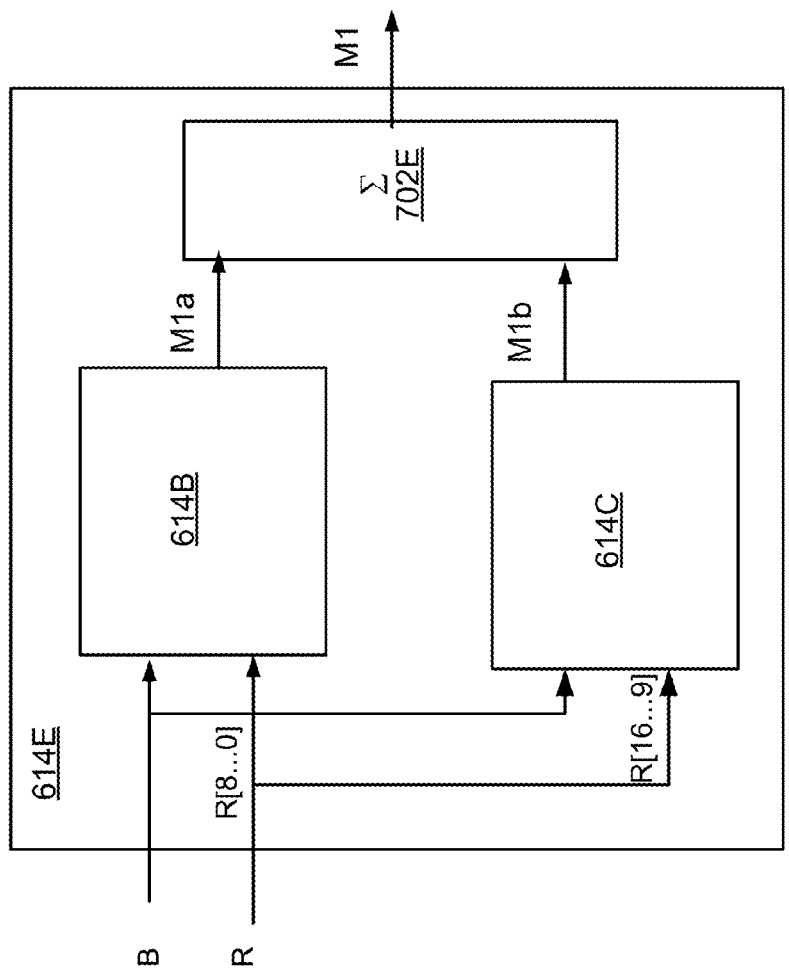

Referring now to FIG. 7C, in some embodiments, the real number multiplier 614B (e.g., 17-bit by 9-bit) and the real number multiplier 614C (e.g., 17-bit by 9-bit) may be combined to provide a real number multiplier 614E (e.g. 17-bit by 18-bit). In one example, the real number multiplier 614E may receive a multiplicand B and a multiplier R, use the real number multiplier 614B to compute M1a, use the real number multiplier 614C to compute M1b, and use an adder 702E to compute M1 by adding M1a and M1b. In such embodiments, in subsequent steps to compute the real value G1 and imaginary value H1, instead of using M1a and M1b, the value M1 may be used.

Referring back to FIG. 5, the method 500 then proceeds to block 508, where values M0, M1 a, M1 b, and M2 are computed using the four multipliers. Referring to the example of FIG. 6B, in some embodiments, the values M0, M1a, M1b, and M2 are computed using the real number multipliers 614A, 614B, 614C, and 614D. In some embodiments, the real number multiplier 614A receives the multiplicand C from the input 206A, receives the multiplier Q from the adder/subtractor 214A, and compute the product M0 of the multiplicand C and the multiplier Q, and may send the product M0 to the adder/subtractor 218A.

In some embodiments, the real number multiplier 614B receives the multiplicand B from the input 204A, receives a lower portion of R (e.g., R[8 . . . 0]) from the adder/subtractor 604, and compute the product M1a as discussed above with reference to FIG. 7A. In some embodiments, the real number multiplier 614C receives the multiplicand B from the input 204A, receives a higher portion of R (e.g., R[16 . . . 9]) from the adder/subtractor 604, and compute the product M1 b as discussed above with reference to the real number multiplier 614C with reference to FIG. 7B.

Alternatively, in some embodiments, in place of the real number multiplier 614B and 614C, a real number multiplier 614E may receive the multiplicand B from the input 204A, receives the multiplier R from the adder/subtractor 604, and compute the value M1 as discussed above with reference to FIG. 7C.

In some embodiments, the real number multiplier 614D receives the multiplicand D from the input 206B, receives the multiplier S from the adder/subtractor 214B, and compute the product M2 of the multiplicand D and multiplier S. The real number multiplier 614D may send the product M2 to the adder/subtractor 218B.

Referring back to FIG. 5, the method 500 then proceeds to block 510, where a real value of (A+jB)*(C+jD) is computed using an adder/subtractor of the first circuit portion. Referring now to FIG. 6B, in the illustrated example, values M1a and M1b are sent to both adder/subtractors 218A and 218B by the real number multipliers 614B and 614C. Alternatively, the value M1 may be sent from a real number multiplier 216E to both adders/subtractors 218A and 218B.

In some embodiments, the adder/subtractor 218A in the circuit portion 602A may receive M0 from the real number multiplier 614A. In some embodiments, the adder/subtractor 218A may receive M1 a from the real number multiplier 614B, and receive M1 b from the real number multiplier 614C. Alternatively, the adder/subtractor 218A may receive M1 from the real number multiplier 614E. The adder/subtractor 218A may compute a real value G1 of (A+jB)*(C+jD) as follows:

$$G1=M0+M1=M0+M1a+M1b.$$

In some embodiments, the real value G1 is then sent from the adder/subtractor 218A to the output 616A of the IC 600B. In some embodiments, the real value G1 provided by the output 616A may have a latency of 5 cycles comparing to the inputs 606, 608, 610, and 612.

In some embodiments, a real value G2 of (A+jB)*(C+jD)+(E+jF) is computed using the adder/subtractor 218A of the circuit portion 602A. As illustrated in FIG. 6B, the adder/subtractor 218A may receive the real value E of the complex number E+jF, and calculates the real value G2 as follows:

$$G2=G1+E.$$

In some embodiments, the real value G2 is then sent from the adder/subtractor 218A to the output 616A of the IC 600B. In some embodiments, the real value G1 provided by the output 616A may have a latency of 5 cycles comparing to the inputs 606, 608, 610, and 612.

Referring back to FIG. 5, the method 500 then proceeds to block 512, where an imaginary value of (A+jB)*(C+jD) is computed using an adder/subtractor in the second circuit portion. Referring to the example of FIG. 6B, in some embodiments, an adder/subtractor 218B may receive M1a from the real number multiplier 614B, and receives M1b from the real number multiplier 614C. Alternatively, in some embodiments, the adder/subtractor 218B may receive M1 from the real number multiplier 614E. The adder/subtractor 218*b* may receive M2 from the real number multiplier 614D, and compute an imaginary value H1 of (A+jB)*(C+jD) as follows:

$$H1=M2+M1=M2+M1a+M1b.$$

In some embodiments, the imaginary value H1 is then sent from the adder/subtractor 218B to the output 616B of the IC 600B. In some embodiments, the imaginary value H1 provided by the output 616B may have a latency of 5 cycles comparing to the inputs 606, 608, 610, and 612.

In some embodiments, an imaginary value H2 of (A+jB)*(C+jD)+(E+jF) is computed by the circuit portion 602B. As illustrated in FIG. 6B, the adder/subtractor 218B may receive the imaginary value F of the complex number E+jF. and calculates the imaginary value H2 as follows:

$$H2=H1+F.$$

In some embodiments, the imaginary value H2 is then sent from the adder/subtractor 218B to the output 616B of the IC 600B. In some embodiments, the imaginary value H2 provided by the output 616B may have a latency of 5 cycles comparing to the inputs 606, 608, 610, and 612.

In some embodiments, the fabric resources used to in the IC 600B of FIG. 6B are substantially less than the fabric resources used in the IC 400 of FIG. 4. Tables 3 and 4 below list some exemplary fabric resources (e.g., pipeline registers and interconnect elements 414) required by the IC 600B of FIG. 6B. The fabric resources may also affect the die area occupied by the IC 600B. In some embodiments, the total die area of the IC 600B may be about three times the die area 222 of a single DSP slice 200. For example, the total die area of the IC 600B may include the die area for two circuit portions 602A and 602B (e.g., about two times the die area 222), each may include an incremental area cost of 15%. For further example, the total die area of the IC 600B may include the die area for the pipeline resources (e.g., about the same as the die area 222).

TABLE 3

Pipeline Register Resources for IC 600B

| Pipeline registers | Type | FFs |
|---|---|---|
| 402-1 | 16 bit pipeline registers | 16 |
| 402-2 | 16 bit pipeline registers | 16 |
| 402-3 | 16 bit pipeline registers | 16 |
| 402-4 | 16 bit pipeline registers | 16 |
| Total | | 64 |

TABLE 4

Interconnect Element Resources for IC 600B

| Port | Number of destinations | Bus Width (bits) | Total interconnection elements for port |
|---|---|---|---|
| 202A | 1 | 16 | 16 |
| 204A | 1 | 16 | 16 |
| 206A | 1 | 16 | 16 |
| 206B | 1 | 16 | 16 |
| 606 | 1 | 16 | 16 |
| 608 | 1 | 16 | 16 |
| 610 | 1 | 16 | 16 |
| 612 | 1 | 16 | 16 |
| 616A | 1 | 33 | 33 |
| 616B | 1 | 33 | 33 |
| Total | | | 226 |

It is noted that various configurations (e.g., signal width, L, N, size of the multipliers) discussed above with reference to FIGS. 2A-7C are exemplary only and not intended to be limiting beyond what is specifically recited in the claims that follow. It will be understood by those skilled in the art that other configurations may be used. Furthermore, while unsigned numbers are used to describe the examples of FIGS. 3-7C, similar to the real number multiplier 216 and its products arrays discussed above with reference to FIG. 2B, the real number multipliers and product arrays in various embodiments may be configured to support multiplications of either unsigned numbers or signed numbers.

In some embodiments, in the IC 600B, the value M1 may be computed using separate product arrays (e.g., without using the product arrays of the original real number multipliers 216A and 216B). In some embodiments, the value M1 may be duplicated in the first circuit portion 602A and the second circuit portion 602B (e.g., by adding an additional real number multiplier to each of the first circuit portion 602A and the second circuit portion 602B). By including the additional real number multipliers in the same DSP slice as other components of the IC 600B, similar savings in interconnects and placement regularity may be achieved.

In some embodiments, in the IC 600B, the complex multiplication may be performed as by performing four real multiplications (e.g., A*C, B*D, A*D, and B*C) in parallel by using the multipliers 216A, 216B, and the additional multipliers added to the IC 600B. By including the additional real number multipliers in the same DSP slice as other components of the IC 600B, similar savings in interconnects and placement regularity may be achieved.

Various advantages may be present in various applications of the present disclosure. No particular advantage is required for all embodiments, and different embodiments may offer different advantages. One of the advantages in some embodiments is that by using a reduced number of DSP slices to implement a complex multiplier, more flexible and regular layout may be achieved, which may increase DSP density, reduce cost, and improve performance. In one example, the complex multiplier is implemented by integrating two DSP slices placed side by side, which may reduce both interface and interconnect requirements. Another advantage in some embodiments is that by splitting the two real number multipliers in the DSP slices to provide real number multipliers at lower word length used in a complex number multiplier, a multiplier circuit may be configured to operate in one of two modes. For example, in the first mode, the multiplier circuit may be capable of performing two real number multiplications in parallel. For further example, in the second mode, the multiplier circuit may be capable of performing a complex number multiplier.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A method, comprising:
   receiving, by an integrated circuit, a first complex number and a second complex number at one or more data inputs;
   determining a first value using a first set of product arrays of a first real number multiplier;
   determining a second value using a second set of product arrays of the first real number multiplier and a third set of product arrays of a second real number multiplier;
   determining a third value using a fourth set of product arrays of the second real number multiplier;
   determining a real value of a first product of the first complex number times the second complex number using the first value and the second value; and
   determining an imaginary value of the first product using the second value and the third value.

2. The method of claim 1, wherein the determining the second value further includes:
   determining a first portion of the second value using the second set of product arrays of the first real number multiplier;
   determining a second portion of the second value using the third set of product arrays of the second real number multiplier; and
   determining the second value by using the first portion of the second value and the second portion of the second value.

3. The method of claim 2,
   wherein A represents a real value of the first complex number and B represents an imaginary value of the first complex number,
   wherein C represents a real value of the second complex number and D represents an imaginary value of the second complex number,
   wherein the first value is equal to (A−B)*C;
   wherein the second value is equal to (A+B)*D;
   wherein the third value is equal to B*(C−D);
   wherein the determining the real value of the first product includes adding the first value and the second value; and
   wherein the determining the imaginary value of the first product includes adding the second value and the third value.

4. The method of claim 3, wherein the first portion of the second value may be expressible as:

$$M1a = 2^{-N1} B \sum_{i=N1}^{N2} R_{i-N1} 2^i;$$

wherein the second portion of the second value may be expressible as:

$$M1b = 2^{-(N2-N1)} B \sum_{i=N1}^{N2} R_{i-(N2-N1)} 2^i;$$

wherein R=C−D, M1a represents the first portion of the second value, M1b represents the second portion of the second value, and N1 and N2 are integers.

5. The method of claim 1, wherein each of the real value and the imaginary value of the first product has a latency of equal to or less than five clock cycles from the one or more data inputs.

6. The method of claim 1, wherein at least one of the real value and the imaginary value of the first product is determined using the first value, the second value, and the third value.

7. The method of claim 1, further comprising:
   switching between a first mode of real number multiplication and a second mode of complex number multiplication.

8. The method of claim 7, further comprising:
   during operating in the first mode, performing a first real number multiplication using the first real number multiplier and performing a second real number multiplication using the second real number multiplier.

9. The method of claim 8, wherein the integrated circuit includes a programmable logical device (PLD).

10. The method of claim 9, wherein the PLD includes a field programmable gate array (FPGA), further comprising:
    configuring the FPGA by a configuration bitstream from a memory coupled to the integrated circuit, and
    determining a selected mode of the FPGA according to the configuration bitstream.

11. An integrated circuit, comprising:
    one or more data inputs configured to receive a first complex number and a second complex number;
    a first real number multiplier including a first set of product arrays and a second set of product arrays;
    a second real number multiplier including a third set of product arrays and a fourth set of product arrays; and
    one or more data outputs configured to output a product of the first complex number times a second complex number;
    wherein the integrated circuit is configured to:
       determine a first value using the first set of product arrays;
       determine a second value using the second and third sets of product arrays;
       determine a third value using the fourth set of product arrays;
       determine a real value of the product using the first value and the second value; and determine an imaginary value of the product using the second value and the third value.

12. The integrated circuit of claim 11, wherein the integrated circuit is configured to:
   determine a first portion of the second value using the second set of product arrays of the first real number multiplier;
   determine a second portion of the second value using the third set of product arrays of the second real number multiplier; and
   determine the second value by using the first portion of the second value and the second portion of the second value.

13. The integrated circuit of claim 12, wherein A represents a real value of the first complex number and B represents an imaginary value of the first complex number,
   wherein C represents a real value of the second complex number and D represents an imaginary value of the second complex number,
   wherein the first value is equal to (A−B)*C;
   wherein the second value is equal to (A+B)*D;
   wherein the third value is equal to B*(C−D);
   wherein the real value of the product is determined by adding the first value and the second value; and
   wherein the imaginary value of the product is determined by adding the second value and the third value.

14. The integrated circuit of claim 13, wherein the first portion of the second value may be expressible as:

$$M1a = 2^{-N1} B \sum_{i=N1}^{N2} R_{i-N1} 2^i;$$

wherein the second portion of the second value may be expressible as:

$$M1b = 2^{-(N2-N1)} B \sum_{i=N1}^{N2} R_{i-(N2-N1)} 2^i;$$

wherein R=C−D, M1a represents the first portion of the second value, M1b represents the second portion of the second value, and N1 and N2 are integers.

15. The integrated circuit of claim 11, wherein at least one of the real value and the imaginary value of the product is determined using the first value, the second value, and the third value.

16. The integrated circuit of claim 11, wherein the integrated circuit is configured to:
   switch between a first mode of real number multiplication and a second mode of complex number multiplication.

17. The integrated circuit of claim 16, wherein the integrated circuit is configured to:
   during operating in the first mode, perform a first real number multiplication using the first real number multiplier and perform a second real number multiplication using the second real number multiplier.

18. The integrated circuit of claim 17, wherein at least one of the real value and the imaginary value of the product has a latency of five clock cycles from the one or more data inputs.

19. The integrated circuit of claim 18, further comprising:
   a programmable logical device (PLD).

20. The integrated circuit of claim 19, wherein the PLD includes a field programmable gate array (FPGA),
   wherein the FPGA is configured by a configuration bitstream from a memory coupled to the integrated circuit, and
   wherein the FPGA switches between the first mode of real number multiplication and the second mode of complex number multiplication according to the configuration bitstream.

* * * * *